(No Model.)
C. E. BUCKBEE.
PNEUMATIC TIRE REPAIRER.
No. 515,284. Patented Feb. 20, 1894.
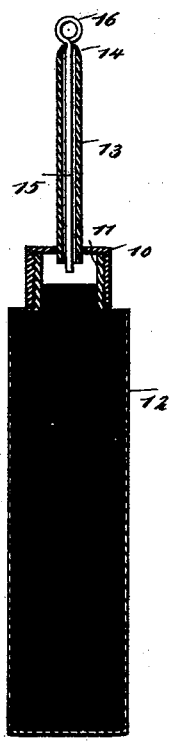
Fig.1.
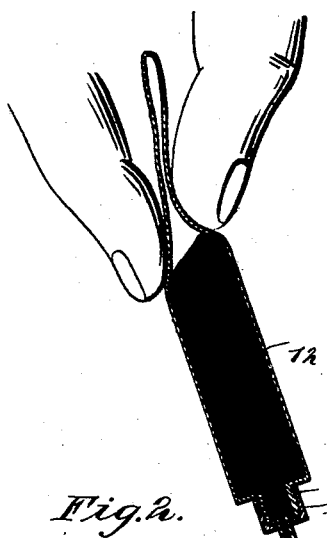
Fig.2.
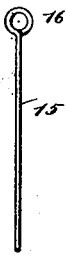
Fig.3.
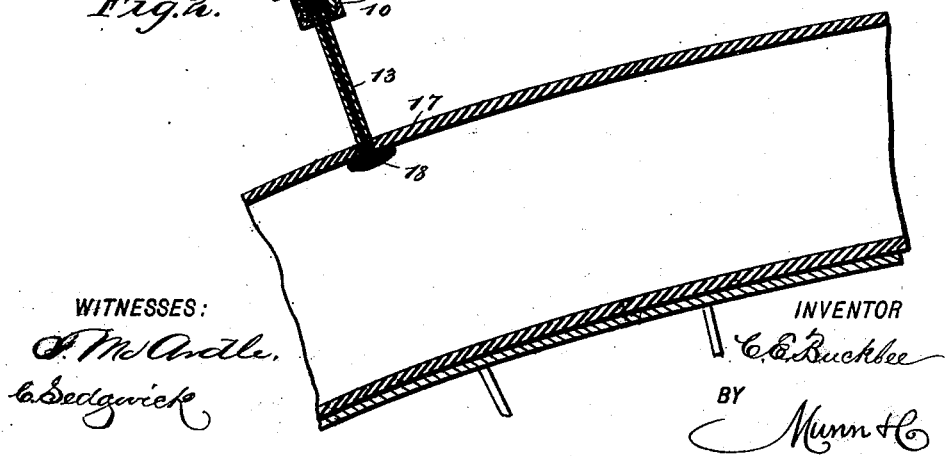
WITNESSES:
F. McArdle
C. Sedgwick
INVENTOR
C. E. Buckbee
BY
Munn & Co.
ATTORNEYS.

UNITED STATES PATENT OFFICE.

CHARLES E. BUCKBEE, OF FLUSHING, MICHIGAN, ASSIGNOR OF TWO-THIRDS TO CHARLES S. WHEELER AND GEORGE CRONK, OF SAME PLACE.

PNEUMATIC-TIRE REPAIRER.

SPECIFICATION forming part of Letters Patent No. 515,284, dated February 20, 1894.

Application filed May 13, 1893. Serial No. 474,110. (No model.)

*To all whom it may concern:*

Be it known that I, CHARLES E. BUCKBEE, of Flushing, in the county of Genesee and State of Michigan, have invented a new and Improved Tire Repairer, of which the following is a full, clear, and exact description.

My invention relates to improvements in devices for repairing punctured pneumatic tires or other rubber tubes; and the object of my invention is to produce an extremely cheap and simple device which may be carried conveniently in the pocket or in the tool bag of the bicycle, which may be quickly inserted in the puncture of the tire, and which enables the cement to be applied to the tire so as to firmly seal the puncture.

To this end my invention consists of a tire repairer the construction of which will be hereinafter described and claimed.

Reference is to be had to the accompanying drawings forming a part of this specification, in which similar figures of reference indicate corresponding parts in all the views.

Figure 1 is a longitudinal section of my improved tire repairer as applied to a cement tube. Fig. 2 is a similar section, showing the repairer and tube as applied to a pneumatic tire to mend a puncture therein; and Fig. 3 is a detail view of the plunger which is held in the tubular needle of the repairer.

The repairer is provided with a cylindrical cap 10, which is threaded interiorly and is adapted to screw upon the neck 11, of an ordinary cement tube 12, as shown clearly in Fig. 1. The cap is provided with an outwardly extending needle 13, which opens from the cap and which is slightly pointed at its outer end, as shown at 14, to enable it to be easily inserted in the puncture of the tire or other tube.

In the tubular needle 13 is carried a plunger 15, which is long enough to extend through the needle and which is preferably provided, at its outer end, with a coil or ring 16, to prevent it from dropping through the needle, and this plunger is used for pushing back and forth through the needle so as to prevent the needle from being choked up by half dried cement, and it may also be used for cleaning out the puncture in the tube or tire which is to be repaired.

The tube 12 is the ordinary flexible tube such as is used for holding rubber cement, and in repairing a tire 17 or similar tube which has been punctured, the needle is inserted while there is sufficient air pressure in the tire to hold the inner tube in place, then the air is allowed to escape through the needle before the cap 10 of the needle is screwed to the cement tube. The cement tube is then screwed to the cap and the wheel is inverted so that the cement will follow the needle readily as it is pulled out of the tire. The tube 12 is squeezed until sufficient cement is passed through the puncture of the tire to accumulate in a small button 18 on the inner side of the tire, after which the needle is withdrawn, being meanwhile turned slightly and the tube 12 squeezed gently so that a current of cement follows the needle and fills the puncture, thus tightly sealing the same. If necessary, the plunger 15 may be inserted in the puncture before applying the needle, so as to make sure that the needle will enter readily.

Having thus described my invention, I claim as new and desire to secure by Letters Patent—

1. The method of repairing pneumatic tires which consists in injecting rubber cement through a fracture of the tube to cover the inner surface of the tube about the point of fracture and then injecting an additional quantity of the material to fill the fracture from the inner surface to the exterior of the tube, substantially as set forth.

2. The method of repairing pneumatic tires which consists in inserting a tubular needle connected with a supply of rubber cement into the hole or fracture to be repaired, forcing sufficient of the cement through the needle to cover the inner surface of the tube about the point of fracture, and form a button thereon, and withdrawing the needle while the tire is inverted so that the current of cement will follow the needle and fill the puncture, substantially as set forth.

3. A tire repairer comprising a flexible cement tube closed at one end and open at the other, a cap adapted to fit the open end of the cement tube, and a tubular needle secured to the cap, substantially as described.

4. A tire repairer, comprising a cap adapted to be attached to a source of cement supply, a tubular needle leading from the cap, and a plunger adapted to fit within the needle, substantially as described.

CHARLES E. BUCKBEE.

Witnesses:
C. S. WHEELER,
F. H. NILES.